Oct. 20, 1964 W. A. NIKAZY Re. 25,665
VARIABLE STANDING TIME CONTROL
Original Filed Feb. 16, 1954 4 Sheets-Sheet 1
Fig. I
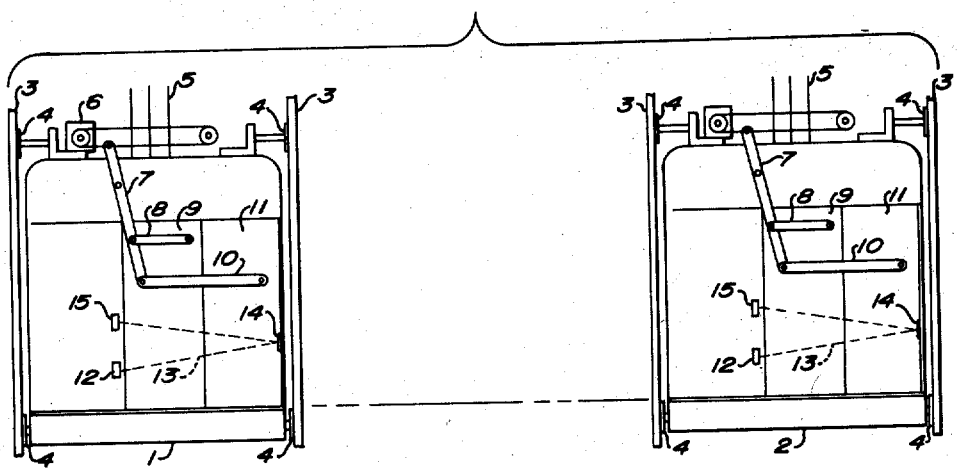
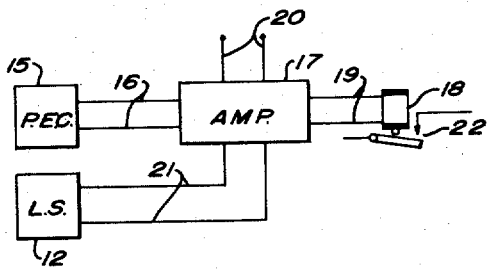
Fig. II
INVENTOR.
WALTER A. NIKAZY
BY
Marshall, Marshall & Yeaston
ATTORNEYS VARIABLE STANDING TIME CONTROL
Original Filed Feb. 16, 1954 4 Sheets-Sheet 2
Fig. III
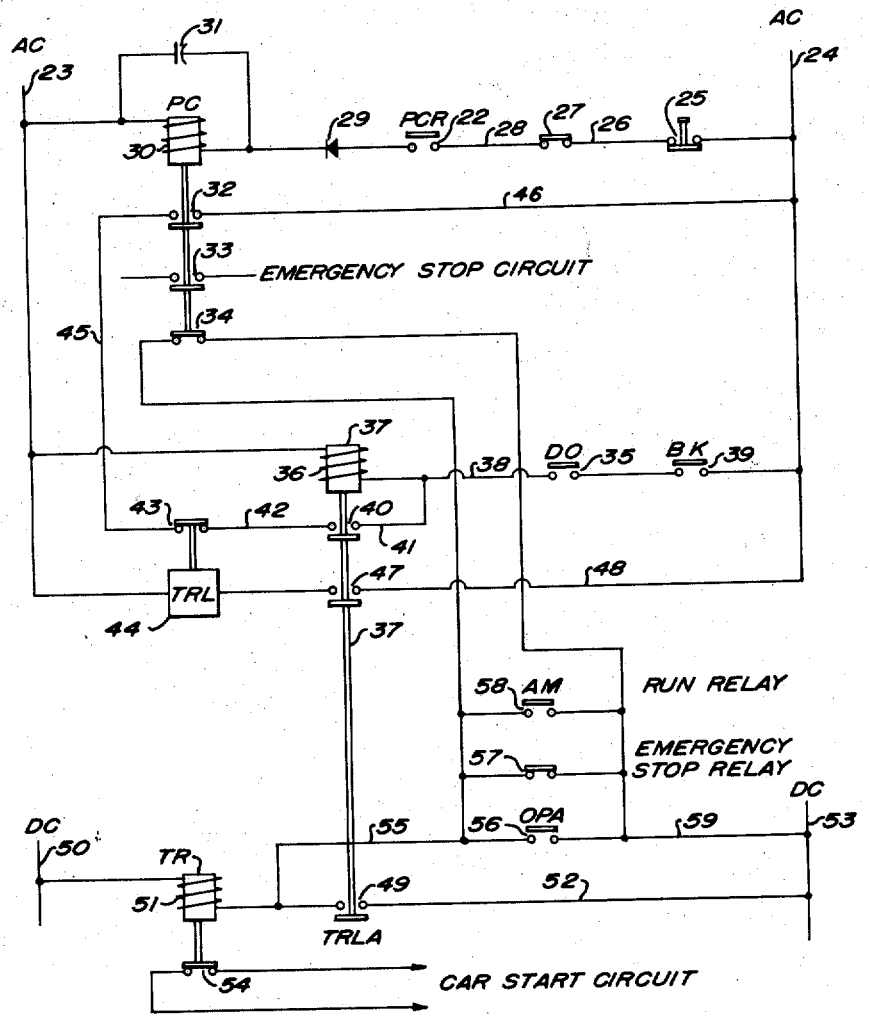
INVENTOR.
WALTER A. NIKAZY
BY
Marshall, Marshall & Yeaeticy
ATTORNEYS VARIABLE STANDING TIME CONTROL
Original Filed Feb. 16, 1954 4 Sheets-Sheet 3
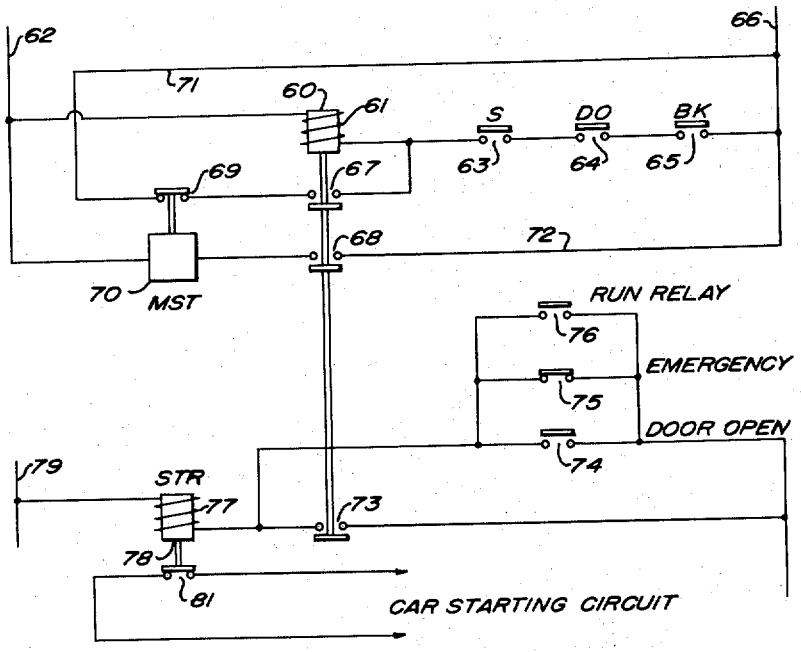
Fig. IV
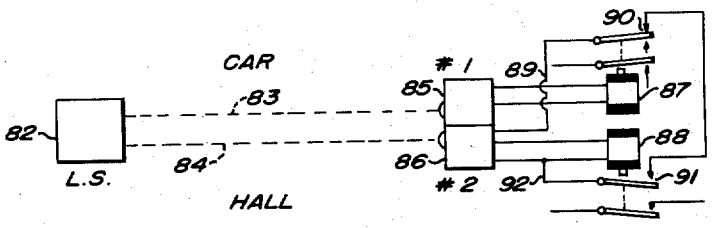
Fig. V
INVENTOR.
WALTER A. NIKAZY
BY
Marshall, Marshall & Yeaeting
ATTORNEYS VARIABLE STANDING TIME CONTROL
Original Filed Feb. 16, 1954 4 Sheets-Sheet 4
Fig VI
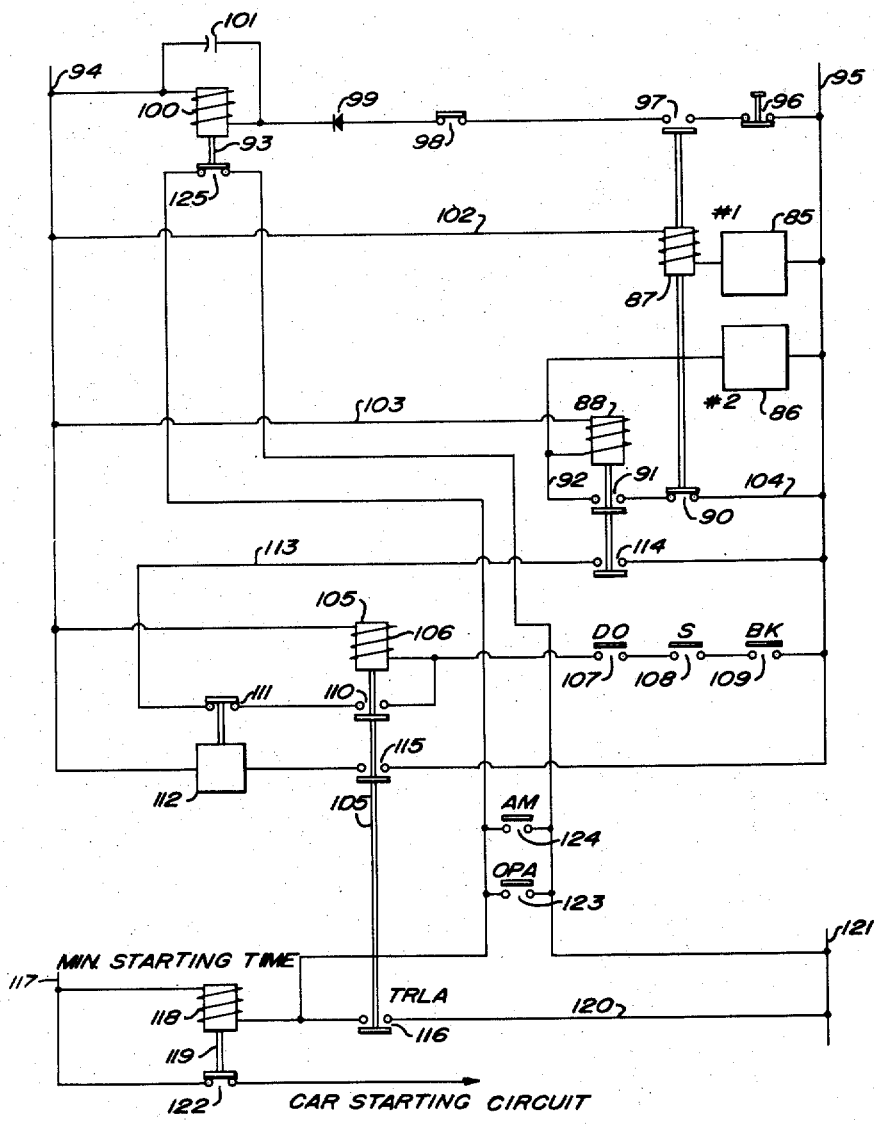
INVENTOR.
WALTER A. NIKAZY
BY
Marshall, Marshall, & Fleming
ATTORNEYS United States Patent Office Re. 25,665
Reissued Oct. 20, 1964

25,665

VARIABLE STANDING TIME CONTROL

Walter A. Nikazy, Toledo, Ohio, assignor to Toledo Scale Corporation, Washington Township, Ohio, a corporation of Ohio Original No. 2,758,676, dated Aug. 14, 1956, Ser. No. 410,482, Feb. 16, 1954. Application for reissue May 6, 1957, Ser. No. 657,995

29 Claims. (Cl. 187—29)

Matter enclosed in heavy brackets [ ] appears in the original patent but forms no part of this reissue specification; matter printed in italics indicates the additions made by reissue.

This invention relates to elevator controls and in particular to control means for completely automatic elevators arranged to vary the standing time at a floor in accordance with the passenger demand.

When push-button controlled automatic elevators are operated without the services of an attendant the controls must be adjusted so that the elevator stands at a floor for a certain length of time before closing the doors and proceeding to the next floor. If an operator is in attendance the minimum time can be made materially shorter since the operator can manually lengthen the time interval by interrupting the door closing operation as may be required to permit the entrance or exit of passengers. For satisfactory operation without an attendant the doors must be held open for a time interval generally equal to the maximum time required for prospective passengers to move to the elevator entrance and enter the car. If a number of cars are arranged in a bank so that the end cars are quite widely separated this time interval required for a prospective passenger to reach the car answering his call may be quite long. Situations may also occur where the intending passenger may be standing directly in front of the car that answers his call in which case he may promptly enter the car and then have to wait for the remainder of the time interval before the car will start. This waiting time is quite annoying and therefore objectionable.

The principal object of this invention is to provide a control that is responsive to the entrance or exit of a passenger and effective to shorten the standing time at a floor to a minimum time interval after the last passenger has entered or left the car.

Another object of the invention is to provide a control in which a maximum time interval that a car is held at a floor is pre-set according to the maximum time required and control means are effective upon the entrance of a passenger into the car to cancel the remaining portion of the pre-set time interval.

A still further object of the invention is to utilize a photoelectric door protective system to regulate or select the time interval during which the doors remain open after a stop at a floor.

Another object of the invention is to provide means to establish different standing times depending upon whether the stop is made in response to a car call or a hall call.

More specific objects and advantages are apparent from the following description of the invention.

According to the invention the time at which the doors of a car reclose after a stop is made at a floor is controlled jointly by two timers operating in sequence. The first of these timers to operate is set to time an interval of approximately ten seconds and it is permitted to start its timing interval as soon as the doors reach full open position as a car stops at a floor. The second timer is energized or started on its timing interval as soon as the first timer times out and the doorway is clear. The first timer is allowed to run until either a passenger enters or leaves the car thereby interrupting the light beam of the door protective system or until its time interval has expired. Upon the occurrence of either of these events the second timer, a flux decay time relay, is de-energized to start its timing interval, that is the interval of approximately two seconds before closing the doors and starting the car. The invention also contemplates using photoelectric controls or similar devices that are capable of distinguishing between a passenger entering a car and one leaving the car. The control circuits of the invention may also be employed in elevator controls where there are no door protective devices by arranging the timing intervals to be selected according to whether the car stops in response to a hall call or in response to car call. If the car stops in response to a hall call a longer time interval is provided than is the case when the car stops for a car call. When stopping for a car call the passenger in the car knows that the car is stopping for his floor and is alerted and ready to immediately leave the car. However, the intending passenger on the floor awaiting an elevator does not know precisely when the car is going to arrive in response to the call or which car will answer his call. Therefore there is often a delay while an intending passenger approaches the car.

A preferred embodiment of the invention is illustrated in the accompanying drawings.

In the drawings:

FIGURE I is a view of two spaced apart elevators such as the end elevators of a bank of elevators showing the location of the photoelectric equipment.

FIGURE II is a schematic wiring diagram of one of the photoelectric systems for detecting obstructions in the doorway of an elevator.

FIGURE III is a schematic wiring diagram of the controls and timers that determine the standing time interval of one of the elevator cars.

FIGURE IV is a wiring diagram showing the control circuits of the invention applied to an elevator without photoelectric door protective devices and arranged to distinguish between a car call and a hall call.

FIGURE V is a fragmentary schematic diagram illustrating the use of two photoelectric cells to distinguish between the entrance or exit of a passenger.

FIGURE VI is a wiring diagram showing the circuits for determining the time interval according to whether the passenger left the car or entered the car.

These specific figures and the accompanying description are intended merely to illustrate the invention and not to limit its scope.

In the accompanying drawings FIGURE I illustrates the condition that often occurs when two or more elevators any of which may answer a call are separated by a considerable distance. As indicated in this figure an elevator car 1 may be the left hand car of a bank while an elevator car 2 may be at the right end of the bank. There may be a number of cars between these two. According to usual practice each of the cars is guided by hatchway rails 3 running vertically along the sides of the hatchway and engaging guide shoes 4 attached to each of the elevator cars. Each car is supported by cables 5 running up the hatchway to drive equipment, not shown.

Each of the cars is also equipped with a door operating mechanism 6 that includes a pivoted lever 7 connected through a link 8 to a first door 9 and through a second link 10 to a second door 11. Since the distance from the fulcrum of the lever 7 to the links 8 and 10 is different the travel of the doors 9 and 11 is also different. This allows the doors to overlap each other in open position and close in slightly overlapping position to close the entire door opening of the elevator car. The door control mechanism for each of the cars also includes a light scource 12 that projects a beam of light, indicated by a dotted line 13, to a mirror 14 on the opposite side of the doorway of the car the light being reflected from the mirror 14 to a photoelectric cell 15 mounted on the frame of the car. The photoelectric cell is connected into the control system of the elevator so that the doors cannot be closed unless the light beam 13 is uninterrupted. Thus if any passenger or other obstruction is in the doorway of the elevator the doors will not attempt to close.

FIGURE II illustrates in a simple form the wiring for each of the photoelectric cells including its relay. Thus in this figure the photoelectric cell 15 is shown connected by leads 16 to an amplifier 17 that steps up the power of the signals sufficiently to operate a relay 18 connected to the amplifier through leads 19. The amplifier 17 receives power from a power line through leads 20 and also, through leads 21, furnishes power to the light source 12 also shown on each elevator car in FIGURE I. The relay 18, controlled by the photoelectric cell, may have one or more sets of contacts 22 depending upon the number of circuits that must be operated according to the condition of the relay.

Referring now to FIGURE III the master photocell relay PC shown near the upper portion of the figure is energized from supply lines 23 and 24 by way of a circuit that includes a normally closed door-open button 25 in the elevator car, a lead 26, a safety switch 27 operated by the edge of the elevator car door, a lead 28, contacts 22 of the photocell relay 18, a rectifier 29 and an operating coil 30 of the master photocell relay PC. The rectifier 29 is included since alternating current power is supplied to the leads 23 and 24 and a much more sensitive master control relay may be used if energized by direct current. The direct current also reduces the power handling capacity required of the various switches in the circuit. In order to eliminate chattering or noise of the master photocell relay PC a condenser 31 is connected in parallel with its operating coil 30. This master photocell relay PC is energized as long as the light [beams] *beam* across the door of the car is uninterrupted, i.e. no one is in the doorway. The relay may also be de-energized should someone push on the edge of the door so as to open the contacts 27 or should someone push the door open button 25. Therefore contacts 32, 33 and 34 of the master photocell relay PC are in their operated position, the reverse of that shown, as long as conditions are correct for the car to be started and operated.

As the elevator car closely approaches a floor in response to car signal or a floor signal requiring a stop at that floor, the door relay, operating to open the doors, closes its contacts 35 shown in FIGURE III so as to momentarily complete a circuit from the supply line 23 through an operating coil 36 of an auxiliary timing relay 37, through lead 38, the now closed door relay contacts 35, and contacts 39 of the brake relay of the elevator system to the return lead 24. As is usual in circuits of this type the contacts 39 of the brake relay are arranged so that the contacts are closed as long as the brake is released and the car is under the control of the elevator drive motor. As soon as a car has stopped and leveled at a floor the brake relay releases thus opening the contacts 39. Thus the operating coil 36 of the auxiliary timer relay 37 is momentarily energized as the doors are opening as the car stops at the floor. Once it is stopped the operating coil 36 of the relay can no longer be energized through this circuit.

The auxiliary timing relay 37 when energized closes its contacts 40 so as to complete a circuit through a lead 41, the now closed contacts 40, a lead 42, normally closed contacts 43 of a synchronous motor driven timer 44, and then through lead 45, contacts 32 of the master photocell relay PC, and lead 46 to the return supply lead 24. This circuit seals the relay 37 in operated condition. The auxiliary timing relay 37 is, in effect, a maximum standing time relay the maximum time interval of which is determined by the operation of the timer 44. As soon as the auxiliary timing relay 37 was energized it also closed its contacts 47 to complete a circuit from the supply lead 23 through the drive motor of the timer 44, the now closed contacts 47 and a lead 48 leading to the return line 24.

Energization of the auxiliary timing relay 37 also caused it to close its contacts 49 to complete a circuit from a D.C. power lead 50 through an operating coil 51 of a starting time relay TR and thence through the now closed contacts 49 and lead 52 to a return direct current lead 53. Energization of the starting time relay TR opens its contacts 54 so as to disable the car starting circuit indicated merely as leads connected to the contacts 54.

The starting time relay TR may also be energized through a lead 55 and any of several sets of contacts 56, 57, 58 or the contacts 34 of the master photocell relay PC, these contacts all being connected in parallel, and thence through a lead 59 to the return D.C. lead 53. These parallel contacts serve as safety controls so that the car starting circuit cannot be completed as long as (a) the doors are [open] *opening* which is indicated by the closure of the contacts 56 or (b) the emergency stop relay is released thereby closing contacts 57 or (c) the elevator is running as is indicated by the closure of contacts 58. Likewise should the master photocell PC be de-energized as by interrupting the light beam across the elevator doors or by operation of door opening button 25 or the safe edge door contacts 27 the car starting circuit cannot be completed.

It should also be noticed that master photocell relay PC includes contacts 33 that are included in the circuit for the emergency stop controls. For safety reasons this circuit is arranged such that it must be complete before the car can be started. Once started other contacts in parallel with the contacts 33 close so that the opening of the contacts 33 will not interrupt such circuit and stop the car.

In the operation of this circuit as a car approaches a floor for a stop the auxiliary timing relay 37 is energized through the brake relay contacts 39 and door opener relay contacts 35. This relay 37, by closing its contacts 47, starts the long interval timer and, by closing its contacts 49, energizes the starting time relay TR. As long as the relay TR is energized the car starting circuits are disabled. This particular relay is of the flux decay variety and requires approximately two seconds of time after its coil circuit is open before its armature releases to close the contacts 54. Therefore all circuits must be in readiness for starting the car for at least two seconds before the car starting circuit itself is completed.

As long as no one enters or leaves the elevator car, as for example if it stops for a false call, the motor driven timer 44 times out at the end of approximately ten seconds of time and opens its contacts 43. The opening of these contacts breaks the holding circuit for the auxiliary timing relay 37 so that it thereupon is de-energized and opens its contacts 49. If the other circuits for starting the car are in readiness to start the opening of the contacts 49 de-energizes the starting time relay TR and two seconds or so later the car starting circuit is completed by closure of the contacts 54. This cycle of events determines the maximum standing time that a car will wait at a floor before closing its doors and starting toward the next call. When the car has stopped at a floor and a passenger either leaves or enters a car the photocell relay contacts 22 shown in the top line of FIGURE III are open as long as the passenger interrupts the light beam across the elevator car door. Interruption of this circuit de-energizes the master photocell PC so that it opens its contacts 32 thereby breaking the holding circuit for the auxiliary timer relay 37. This relay, without any time delay, immediately drops out thereby opening its contact 49 thus permitting the car to start approximately two seconds after the light beam across the car door has been re-established so as to re-energize the master photocell PC and open the contacts 34.

Therefore in this circuit, as shown, the car doors remain open for approximately 12 seconds, i.e. two seconds longer than the timing interval of the motor driven timer 44, in the event that no one enters or leaves the car. Should a person enter or leave a car before the expiration of this time interval the auxiliary timer relay 37 is released so as to take the motor driven timer out of the control circuit and permit the car to start approximately two seconds after starting conditions are restored. Should more than one passenger be entering or leaving the car the light beam is momentarily interrupted as each passenger passes through the car door and as each one passes the master photocell relay PC is de-energized thereby re-establishing momentarily, through contacts 34, the circuit to the coil 51 of the starting time relay TR. Each pulse of current thus supplied to this relay re-energizes its magnetic circuit so that the relay will not drop out until the light beam remains unbroken for at least two seconds. The circuit is also safe in that should a person hold the edge of the door, as when one passenger holds the car to wait for another, the contacts 27 being held open de-energize the master photocell relay PC so that it remains de-energized thus closing its contacts 34 to keep the starting time relay TR continuously energized. Therefore the car will not start as long as the doors are open, the passenger is holding the edge of the door, or a passenger is standing or walking through the doorway to interrupt the light beam.

FIGURE IV illustrates a similar circuit that may be used in situations where no photocells or photocell relays are used but which will still give a different standing time if the car stops in response to a hall call than if it stops in response to a car call. This difference in standing time may be desirable since when a car stops in response to a car call, that is a call registered from within the car, the passenger leaving the car is standing immediately in front of the door ready to leave as soon as the doors open. Therefore a very short time interval is all that is required. On the other hand, an intending passenger in the hall awaiting the arrival of the car may be standing at a considerable distance from the doorway of the car which answers his call. Thus if the elevator be one of a bank of six cars it is possible that the intending passenger may be as much as 25 or 30 feet away from the car that is answering his call at the time that the doors open. It is therefore necessary to allow a standing time in response to the hall call that is long enough to allow the passenger to cross the intervening space and enter the car. This is provided in the circuit shown in FIGURE IV in that a different time interval is set up depending upon whether the car stops in response to a hall call or a car call.

Referring to this figure an auxiliary timing relay 60 having an energizing coil 61 is supplied with current as the car is approaching the landing by current flow through a circuit from a first alternating current supply lead 62, the energizing or operating coil 61 of the auxiliary timing relay 60, thence through contacts 63 of a floor call stop ping relay S, contacts 64 of a door opener relay and contacts 65 of a brake relay to a return alternating current power lead 66. This circuit is completed only during the time that the car is leveling at the floor and is broken as soon as the brake is applied to the elevator drive motor. Energization of the auxiliary timing relay 60 in response to a hall call causes it to close its contacts 67 and 68. Closure of the contacts 67 completes a holding circuit by way of these contacts and normally closed contacts 69 of a motor driven timer 70 and a return lead 71 connected to the return power lead 66. Thus, although the auxiliary timing relay 60 may be energized to close its contacts only while a car is approaching a floor during the leveling portion of its approach the relay is maintained in an energized condition after interruption of the closing circuit.

Operation of the auxiliary timing relay 60 by closing its contacts 68 also allows current to flow from the first alternating current supply lead 62, through the motor of the motor driven timer 70, the now closed contacts 68 and a lead 72 connected to the return lead 66.

The auxiliary timing relay 60 also has contacts 73 that are arranged in parallel with door opener relay contacts 74, emergency circuit relay contacts 75, and contacts 76 that are closed as the car is running. These parallel contacts are arranged to supply current to an operating coil 77 of a minimum standing time relay 78. This standing time relay 78 is energized from direct current supply leads 79 and 80 and is of the slow drop out variety such that its contacts 81 do not close until two or three seconds after the coil circuit has been interrupted. The minimum standing time relay 78 has its contacts 81 arranged in the car starting circuit so that this relay must release before the starting circuits may be completed to start the car. However, once the car has been started it does not matter whether this circuit is completed or not since the car will remain in running operation until it reaches the next floor that has been signaled or until it reaches a terminal floor.

In this arrangement if a car stops at a floor in response to a car call for that floor the relay S is not energized but the door opener relay contacts 74 are closed as the door is opened. Thus the minimum standing time relay 78 is energized as the doors are being moved to open position. When the doors have reached their open position the contacts 74 are again opened thereby de-energizing the minimum standing time relay 78 so that two or three seconds later the contacts 81 will again be closed to permit the doors to close and the car to start. The car starting circuit is taken through the door closing circuits so that the car cannot move until after the doors have closed.

If the car is stopped in response to a hall call rather than a car call the relay S, having contacts 63 in circuit with the auxiliary timing relay 60, is closed so that not only do the door opener relay contacts 74 energize the minimum standing time relay 78 but also the auxiliary relay 60 is energized so that it seals itself in through the contacts 69 of the motor driven timer. At the expiration of the time interval of the motor driven timer 70 it opens its contacts 69 thereby releasing the auxiliary relay 60 to open its contacts 73. Opening of these contacts 73 de-energizes the coil 77 of the minimum standing time relay so that it can then measure out the additional two or three seconds and then close the doors and start the car.

In this arrangement the car stands at a floor for a minimum time of two or three seconds to permit a passenger to leave the car but will stand at the floor in response to a hall call for a considerably longer period of time to permit a waiting passenger to cross the space and enter the car before the doors start to close.

In the circuit shown in FIGURE III, the circuit that is responsive to the entering or leaving of a passenger, no provision is made to distinguish between a passenger entering the car or one leaving the car. It is thus possible, in the event a passenger leaves a car and an intending passenger is waiting to enter the same car from the lobby or from a hall, that the car doors may close before the intending passenger cna reach the car and enter it. This can occur because the departing passenger upon leaving the car interrupts the light beam and thereby de-energizes the maximum standing time relays, i.e. the motor driven timer 44 and the auxiliary standing time relay 37. To avoid this inconvenience it is desirable in some installations where the highest operating efficiency is required to provide means for distinguishing between passengers entering the car and those leaving the car.

Such distinction may be made by employing two photoelectric cell circuits with their light beams, arranged in substantially parallel, horizontally side by side relationship across the entrance to the car. FIGURE V of the drawings shows such an arrangement including a light source 82 arranged to project a pair of light beams 83 and 84 across the doorway of the car into photoelectric cells 85 and 86. The photoelectric cells including their amplifiers are arranged to operate relays 87 and 88. In this arrangement as a person leaves the car he interrupts the light beam 83 first and before that beam is re-established he interrupts the light beam 84. Thus there is a short but measurable time interval between the interruptions of the two light beams to indicate the direction the passenger is moving. Likewise, a passenger entering the car from the hall interrupts the light beam 84 before reaching the light beam 83. While this time interval may be very short when a passenger is walking rapidly it is nevertheless long enough for the relays to distinguish which direction the passenger is moving. The circuits for distinguishing, in general, include contacts on both relays plus circuit arrangements such that an auxiliary relay will be de-energized if the relays operate in one sequence but will be maintained energized if the sequence is reversed. Such circuits are included in the control circuit illustrated in FIGURE VI.

As shown in FIGURE V both relays 87 and 88 are energized so as to close their normally open contacts as long as both light beams are uninterrupted. Furthermore the relay 88 may be energized from the power source of the photo cell amplifier 86 through a lead 89, contacts 90 of the relay 87, contacts 91 of the relay 88 and lead 92 connected to the power supply of the photo cell 86. In this arrangement if the passenger is going from the car into the hallway he interrupts the light beam 83 first thus de-energizing the relay 87 which thereupon immediately closes its contacts 90. The relay 88 still being energized has its contacts 91 closed so that the auxiliary circuit is completed through the contacts 90 and 91 to energize the relay 88. Therefore this relay does not release when the light beam 84 is broken. Conversely, should the passenger be moving in the other direction so as to break the light beam 84 first, since the relay 87 is energized and the contacts 90 are open, de-energizing the relay 88 causes it to open its contacts 91 thus breaking the auxiliary circuit so that both the relays 88 and 87 are de-energized when both light beams are broken or interrupted.

FIGURE VI shows a control circuit embodying the feature of distinguishing between a passenger entering and one leaving a car as well as fixing the length of time the car will stand at a floor before starting in response to another call. In the circuit shown in FIGURE VI a master photo cell relay 93 is energized from alternating current supply leads 94 and 95 by way of a circuit that includes (a) a manually operable push button 96 installed in the elevator car and serving to open the doors should they be standing closed at a floor such as when a passenger wishes to open the doors and leave the car before going to another floor, (b) contacts 97 of the photo cell relay 87, and (c) contacts 98 operated by the safety strip along the edge of the elevator door. As in FIGURE III a rectifier 99 is included in the circuit to allow the use of a sensitive operating coil 100 for the master photo cell relay 93. A condenser 101 in parallel with the coil 100 prevents chatter of the armature of the relay. This circuit for the master photo cell relay 93 is complete as long as the light beam 83 shown in FIGURE V is uninterrupted and as long as no one is pushing on the edge of the door or is pushing the door open button.

As shown in FIGURE VI the photo cell relay 87 is energized from the supply leads 94 and 95 by way of lead 102 and the photo cell amplifier 85. Likewise, the photo cell relay 88 for the second light beam 84 is energized from the lead 94 through a lead 103, coil of the relay 88 and the second photo cell amplifier 86. A branch circuit for energizing the second photo cell relay 88 includes the lead 92, contacts 91 of the relay 88, normally closed contacts 90 of the relay 87, and a lead 104 connected to the return lead 95.

In this arrangement the photo cell relay 88 remains energized as long as its photo cell 86 is illuminated or as long as both photo cells are dark provided the photo cell 85 is darkened first so as to release the relay 87 and close contacts 90 before the relay contacts 91 of the second relay have a chance to open.

This circuit, in common with the circuit shown in FIGURE III, includes an auxiliary timing relay 105 having an operating coil 106 that is briefly energized, as the car stops, through door opener relay contacts 107, stopping relay contacts 108 and brake relay contacts 109, the latter being connected to the return lead 95. Thus this circuit to energize the auxiliary timing relay 105 is completed momentarily as the car levels itself in approaching the floor. As soon as the timing relay 105 is energized it closes its contacts 110 to complete a sealing circuit through contacts 111 of a motor operated timing relay 112, lead 113, and contacts 114 of the second photo cell relay 88 to the return lead 95. The timing relay 105 when energized closes its contacts 115 to complete an energizing circuit for the motor of the motor operated timing relay 112. In this arrangement the auxiliary timing relay 105 remains energized until either the motor operated timer 112 completes its timing interval and opens its contacts 111 or until the second photo cell relay 88 is de-energized to open its contacts 114.

The auxiliary timing relay 105 also includes contacts 116 arranged to complete a circuit from a direct current supply lead 117 through an operating coil 118 of a minimum standing time relay 119 and return lead 120 connected to a return lead 121 of the direct current power supply. The relay 119 is of the time delayed release so that its contacts 122 do not close until two or three seconds after the circuit to its operating coil 118 has been opened. The contacts 122 of the minimum starting time relay 119 are included in the starting circuit for the car and are operable ordinarily to start the door closing operations, the circuits being arranged so that as soon as the doors reach fully closed position the car is started to answer the next call.

In order that the car shall not start under unsafe conditions contacts 123 of the door opening circuit; contacts 124 of the elevator motor running circuit; and contacts 125 of the master photo cell relay 93 are included in parallel with the contacts 116 such that in the event any of these contacts are closed the minimum starting time relay is energized to hold its contacts 122 open.

In this circuit if the elevator stops in response to a car call the auxiliary timing relay 105 is not energized so that contacts 116 remain open. In this condition the car recloses its doors and starts for the next call at the expiration of the minimum starting time as determined by the minimum standing time relay 119. In the event that the car stops at a floor in response to a hall call contacts 108 of the stopping relay S are closed in addition to contacts 107 and 109 so that the auxiliary timing relay 105 is energized. This relay 105 then holds its contacts 116 closed so that a car cannot restart until after the expiration of a longer time interval determined either by the motor operated timer 112 or by the operation of the photo cell relay 87 or 88. If a passenger leaves a car after the car has stopped in response to both car and hall calls the photo cell amplifier 85 is operated first thereby de-energizing its relay 87 so as to close contacts 90 thereby completing the by-pass circuit to hold the second photo cell relay 88 energized as its light beam is broken. Holding the relay 88 energized maintains the circuit through contacts 114 so that the auxiliary timing relay 105 is not released by the exit of a passenger from the car.

However, as a passenger in the hall enters the car the second photo cell amplifier 86 is operated first thereby de-energizing its relay 88 to open contacts 91 and 114. Opening the contacts 114 releases the auxiliary timing relay 105 thereby conditioning the circuit so that the minimum starting time relay is released as soon as the first photo cell light beam 83 is re-established to energize the master photo cell relay 93 and the other safety circuits are completed. Therefore, the car will start two or three seconds after the hall passenger has entered the car without waiting for the expiration of the full timing interval. This arrangement therefore automatically adjusts the standing time of the car at any floor in accordance with the demand by providing a short time interval for passengers leaving the car and a much longer time interval for passengers approaching the car but which longer time interval is shortened should the passengers enter the car promptly.

Various modifications of these circuits may be made without departing from the scope of the invention.

Having described the invention, I claim:

1. In passenger operated elevator system, in combination, an elevator system equipped with push button controls, operating mechanism operatively connected to the push button controls and subject thereto for running the car to various floors according to calls registered by the push buttons, door operating mechanism for opening the doors as a car approaches a level condition at a floor and for closing the doors preparatory to traveling to another floor, means responsive to the presence of a passenger in the doorway of the elevator for preventing a door closing operation, timing means started by a door opening operation and arranged to time an interval generally equal to the maximum time required for a prospective passenger to note the arrival of a car and enter the car, and means operatively connected to said passenger responsive means adapted to interrupt the operation of said timing means.

2. In a passenger operated elevator system, in combination, an elevator system equipped with push button controls, operating mechanism operatively connected to the push button controls and subject thereto for running the car to various floors in response to calls registered on the push buttons, door operating mechanism for opening the doors as the car levels with a floor, starting time means for initiating a door closing and starting operation, maximum standing time relay means initiated by a door opening operation for delaying the operation of said starting time means, means responsive to a passenger in the door way of the car, and means operatively connected to the passenger responsive means adapted to terminate the operation of the maximum standing time relay and permit an earlier departure of the elevator car.

3. In a passenger operated elevator system, in combination, an elevator system equipped with push button controls, operating mechanism operatively connected to the controls and subject thereto for running the car to various floors in response to calls registered on the push buttons, door operating means for opening the doors as the car stops at a floor, door closing means for closing the doors and starting the car to answer the next call, a starting time relay for energizing the door closing means a predetermined time after the doors may be safely closed, a maximum standing time relay for holding the car for a prospective passenger, means for sensing the passage of a passenger through the door, said sensing means being arranged to de-energize said maximum standing time relay to permit departure of the car under the control of the starting time relay.

4. A control system for an automatic passenger operated elevator according to claim 3 in which said passenger sensing means is a light source and photo relay.

5. A control system according to claim 3 in which the passenger sensing means prevents operation of the starting time relay.

6. In a passenger operated elevator system, in combination, an elevator system equipped with push button controls, operating mechanism operatively connected to the push buttons and subject thereto for running the car to various floors in response to calls registered on the push buttons, door operating means for opening the doors as the car stops at a floor, door closing means for closing the door and starting the car to answer the next call, a starting time relay for measuring a minimum standing time after *the* door is opened or conditions permit starting for the next call for operating said door closing means, a maximum waiting time timer that is started when the doors open, sensing means sensing the direction of movement of a passenger passing through the door, said means being adapted to de-energize said maximum waiting time timer upon movement of a passenger into the car.

7. A control system according to claim 6 in which the sensing means comprises a pair of spaced light beams and a pair of photoelectric relays.

8. In a passenger operated elevator system, in combination, an elevator system equipped with hall call registering and car signaling means, car call registering and signaling means, and control means responsive to the signaling means for stopping the cars at the various floors, door operating means for opening the doors as the car comes to a stop at a floor, first timing means started as the doors open for closing the doors after a minimum time interval, second timing means operable by the hall call signaling means for holding said first timing means for a maximum predetermined time, and means responsive to the passage of a passenger through the door for interrupting said second timing means.

9. In a passenger operated elevator system equipped with hall call registering and car signaling means, control means for operating the elevator cars in response to the hall calls, and door operating means for opening the doors as the car stops at a floor, in combination, starting time means for measuring a minimum standing time for each door operation, wait timing means controlling said starting means for measuring a maximum standing time for each stop, means responsive to the hall call signaling means for starting the wait timing means, and means for detecting the presence of a passenger in the doorway of the car, said detecting means being operatively connected to de-energize the wait timing means.

10. In a passenger operated elevator system, having a plurality of cars responsive to a single hall call system and having means for opening and closing the doors of each car as the car answers a call, in combination, timing means responsive to the opening of a car door and to protective circuits of the elevator for delaying the closing of the doors, auxiliary timing means for further delaying the closing of the doors, means for energizing said auxiliary timing means as the car stops in answer to a hall call, and detecting means for sensing the presence of a passenger in the doorway of a car, said detecting means serving to de-energize the auxiliary timing means to permit closure of the door promptly upon clearance of the passenger from the doorway.

11. In an automatic passenger operated elevator system having a plurality of cars responsive to a single control system, in combination, means for delaying for a first time interval the reclosing of the doors of a car after the opening or the re-establishing of conditions permitting the starting of a car, auxiliary timing means for extending the delay time, and means responsive to the entry of a passenger into a car for de-energizing the auxiliary timing means.

12. In an automatic passenger operated elevator system having a plurality of cars responsive to a single control system, in combination, first timing means energized severally by opening of the elevator doors and operation of safety means for delaying reclosing of the doors for a short time interval after door opening or the re-establishing of safe operating conditions, auxiliary motor operated timing means connected in parallel with said safety means for further delaying the reclosing of the doors, and means responsive to the passage of a passenger through the doors for de-energizing the motor operated timing means.

13. In an automatic passenger operated elevator system having a plurality of cars responsive to a single control system, in combination, a first timing means for each elevator, a motor driven timing means for each elevator, means for energizing the first timing means when the doors reach open position, a passenger is in the doorway, or a safety device signals an unsafe condition, said first timing means serving to delay the reclosing of the elevator doors while it is energized and for a short fixed time interval after it is de-energized, means for energizing the motor driven timer as the doors open, said motor driven timer being connected to energize the first timing means for a fixed maximum time interval, and means responsive to a passenger passing through the door for de-energizing the motor driven timer.

14. Elevator standing time control means according to claim 13 in which the passenger responsive means responds only to passengers entering the elevator.

15. Elevator standing time control means according to claim 13 having means responsive to stops for hall calls for controlling the energization of the motor driven timer.

*16. In an elevator system, a structure having a pair of terminal landings and a plurality of intermediate landings, an elevator car, means mounting the elevator car for movement relative to the structure to serve said landings, motive means for moving the elevator car, and control means cooperating with the motive means for controlling operation of the elevator car, said control means comprising means for stopping the elevator car at a preselected intermediate landing, initiating means responsive to the expiration of a substantial time following the stopping of the elevator car at said preselected intermediate landing for initiating a starting operation of the elevaor car, and load-responsive means responsive to a predetermined movement of a load between the exterior and interior of the elevator car for expediting departure of the elevator car from said intermediate landing when the elevator car is carrying substantially less than a capacity load.*

*17. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a preselected intermediate landing and initiating a door-opening operation of said door-operating means, initiating means responsive to the expiration of a substantial time following the stopping of the elevator car at said preselected landing for initiating a door-closing operation of the door-operating means, start control means responsive to closure of the door for initiating a starting operation of the elevator car, and load-responsive means responsive to movement of the load substantially through the closing path of the door for expediting a door-closing operation of the door-operating means for advancing departure of the elevator car from said preselected intermediate landing.*

*18. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a preselected intermediate landing and initiating a door-opening operation of said door-operating means, initiating means responsive to the expiration of a substantial time following the stopping of the elevator car at said preselected landing for initiating a door-closing operation of the door-operating means, start control means responsive to closure of the door for initiating a starting operation of the elevator car, and load-responsive means responsive to movement of the load substantially through the closing path of the door for expediting a door-closing operation of the door-operating means for advancing departure of the elevator car from said preselected intermediate landing, said load-responsive means comprising transmitting means for transmitting a signal through air in a selected path extending adjacent the closing path of the door, and detecting means responsive to a temporary interruption of transmission of said signal through said selected path for decreasing the time expiration to which said initiating means responds to a value less than said substantial time.*

*19. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a preselected intermediate landing and initiating a door-opening operation of said door-operating means, initiating means responsive to the expiration of a substantial time following the stopping of the elevator car at said preselected landing for initiating a door-closing operation of the door-operating means, start control means responsive to closure of the door for initiating a starting operation of the elevator car, and load responsive means responsive to movement of the load substantially through the closing path of the door for expediting a door-closing operation the door-operating means for advancing departure of the elevator car from said preselected intermediate landing, said load-responsive means comprising transmitting means for transmitting energy through air in a selected path extending adjacent the closing path of the door, and detecting means responsive to each brief interruption of transmission of said energy through said selected path for transferring the initiating means for response to an expiration of a short time following such interruption for initiating a door-closing operation of the door-operating means, said short time being materially smaller than said substantial time.*

*20. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a preselected intermediate landing and initiating a door-opening operation of said door-operating means, initiating means responsive to the expiration of*

*a substantial time following the stopping of the elevator car at said preselected landing for initiating a door-closing operation of the door-operating means, start control means responsive to closure of the door for initiating a starting operation of the elevator car, and load-responsive means responsive to movement of the load substantially through the closing path of the door for expediting a door-closing operation of the door-operating means for advancing departure of the elevator car from said preselected intermediate landing, said load-responsive means comprising transmitting means for transmitting energy through air in a selected path extending adjacent the closing path of the door, and detecting means responsive to each brief interruption of transmission of said energy through said selected path for actuating the door-operating means to reopen the door if the door has partially closed, and for transferring the initiating means for response to an expiration of a short time following such interruption for initiating a door-closing operation of the door-operating means, said short time being materially smaller than said substantial time.*

*21. In an elevator system, a structure having a pair of terminal landings and a plurality of intermediate landings, an elevator car having a passage through which an object may pass between the exterior and interior of the car, means mounting the elevator car for movement relative to the structure to serve the landings, motive means for moving the elevator car, and control means cooperating with the motive means for controlling operation of the elevator car, said control means comprising means for stopping the elevator car at a selected intermediate landing, timing means for measuring a first time interval and a second time interval substantially shorter than the first time interval, start-initiating means responsive to expiration of one of said time intervals measured by the timing means following the stopping of the elevator car at the selected landing for initiating a starting operation of the elevator car, and means responsive to movement of an object substantially through said passage between the interior and exterior of the elevator car for transferring the start-initiating means from control by one of said time intervals to control by the other of said time intervals.*

*22. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a preselected intermediate landing and initiating a door-opening operation of said door-operating means, initiating means responsive to the expiration of a substantial time following the stopping of the elevator car at said preselected landing for initiating a door-closing operation of the door-operating means, start control means responsive to closure of the door for initiating a starting operation of the elevator car, load-responsive means responsive to movement of the load substantially through the closing path of the door for expediting a door-closing operation of the door-operating means for advancing departure of the elevator car from said preselected interemdiate landing, said load-responsive means comprising a transmitter for transmitting energy through air substantially across the path followed by a person in entering or leaving the elevator car through the doorway of said door, a detector for detecting the presence of said energy after it has crossed said path, means cooperating with the detector in response to the presence of an energy-impermeable body in said path for preventing closure of said door by the door-operating means, and means responsive to removal of said body from said path for initiating an operation of the door-operating means to close the door within a maximum time substantially less than said substantial time.*

*23. An elevator system comprising a structure to be served by an elevator car, an elevator car having a passage through which load may enter and leave the elevator car, motive means for moving the elevator car relative to the structure, and control means cooperating with the motive means for moving the elevator car, stopping the elevator car at a predetermined load-transfer position and moving the elevator car away from the load transfer position in response to expiration of a substantial time following said stopping of the elevator car, in combination with means for projecting a signal through air across said passage, detecting means for detecting a function of the signal after such energy has traversed said passage, and expediting means responsive to detection by the detection means of a temporary change in said function within said substantial time for expediting movement of the elevator car from said load-transfer position.*

*24. A closure system comprising a structure having a passage to be closed and exposed by a door, a door for said passage, door-operating means for moving the door relative to the structure to close and expose the passage, a timing device effective after the door has been open for a substantial time for initiating a door closing operation of the door by the door-operating means, a detector device for detecting the presence of an object adjacent said passage, and modifying means cooperating with the detector device in response to detection by the detector device of an object temporarily adjacent said passage while the door is open for maintaining the door substantially open for an appreciable time which is substantially less than said substantial time and for initiating a door-closing operation of the door by the door-operating means on expiration of said appreciable time.*

*25. In an elevator system, a structure having a plurality of landings, an elevator car having a passage through which load enters and leaves the elevator car, means mounting the elevator car for movement relative to the structure to serve the landings, motive means for moving the elevator car relative to the structure, and control means cooperating with the motive means for controlling operation of the elevator car, said control means comprising means effective for initiating a starting operation of the elevator car from any of said landings at which the elevator car is stopped, means for stopping the elevator car at any of said landings, a detector device for detecting a predetermined movement of load through said passage between said elevator car and any landing at which the elevator car is stopped, and initiating means responsive to detection by the detector device of said predetermined movement of load for initiating a starting operation of the elevator car when the car is stopped at a landing regardless of the extent of loading of the elevator car.*

*26. A system as claimed in claim 25 wherein said initiating means initiates said starting operation only after expiration of an appreciable time following the detection by the detector device of said predetermined movement of load.*

*27. A system as claimed in claim 26 wherein said initiating means includes means for delaying said initiation of a startng operation temporarily in response to detection by the detector device of a predetermined movement of a second load substantially through said passage with said appreciable time.*

*28. A system as claimed in claim 26 wherein the detector device is mounted on the elevator car.*

*29. In an elevator system, a structure having a pair of terminal landings and a plurality of intermediate landings, an elevator car, means mounting the elevator car for movement relative to the structure to serve said landings, motive means for moving the elevator car, and control means cooperating with the motive means for controlling operation of the elevator car, said control means comprising stopping means for selecting a landing at which the*

*elevator car is to stop and for stopping the elevator car at a preselected intermediate landing, initiating means cooperating with the stopping means and responsive to the expiration of a substantial time following the stopping of the elevator car at said preselected landing for initiating a starting operation of the elevator car, first time-modifying means operable for conditioning said initiating means to respond to a first value of time smaller than said substantial time following the stopping of the elevator car at said preselected landing for initiating a starting operation of the elevator car, and second time-modifying means operable for conditioning said initiating means to respond*

*to a second value of time smaller than said first value following the stopping of the elevator car at the preselected landing for initiating a starting operation of the elevator car.*

References Cited in the file of this patent or the original patent

UNITED STATES PATENTS

| | | |
|---|---|---|
| 1,822,152 | Kinnard et al. | Sept. 8, 1931 |
| 2,492,010 | Santini | Dec. 20, 1949 |
| 2,634,828 | Bruns et al. | Apr. 14, 1953 |